June 14, 1960

C. ORT 2,940,354

COMBINED RANGE-AND VIEW-FINDERS HAVING
PROJECTED FRAME LINES

Filed March 10, 1958

Carl Ort
INVENTOR.

BY R. Frank Smith

Harold F. Bennett
ATTORNEY & AGENT

United States Patent Office 2,940,354
Patented June 14, 1960

2,940,354

COMBINED RANGE- AND VIEW-FINDERS HAVING PROJECTED FRAME LINES

Carl Ort, Stuttgart-Wangen, Germany, assignor to Eastman Kodak Company, Rochester, N.Y., a corporation of New Jersey Filed Mar. 10, 1958, Ser. No. 720,253

Claims priority, application Germany Sept. 7, 1957

2 Claims. (Cl. 88—204)

This invention relates to coupled range and projected frame line viewfinders of the Galilean type for photographic and cinematographic cameras, wherein two diverging lenses are arranged as viewer lenses one each in the direct and indirect ray paths. Such coupled range and viewfinders are known per se, even in connection with frame lines being reflected into the viewer ray path so as to appear projected onto the object field.

It is the object of the invention to provide a novel combination of features in cooperative arrangement giving a particularly practical structure of a coupled range and viewfinder, combining the advantages of a space-saving arrangement of the necessary parts and easy adjustment.

Said object is attained according to the invention in such a way that the measuring beam is deflected in the direct ray path while the collimator lens and the frame lines are arranged in the indirect ray-path. The deflection of the measuring beam is accomplished by pivoting or shifting the diverging viewer lens laterally in a manner known per se.

According to another feature of the invention, the frame lines provided for outlining the picture area and the collimator lens are arranged within the base in the indirect ray-path.

In order to avoid undesired reflections when looking through the coupled range and viewfinder and for a clear separation of the indirect beams, from the image frame and from the rangefinder mirror, a further feature of the invention provides that between the viewer lens in the rangefinder beam and the frame line member a light tight tube is arranged, within which the image beam of the rangefinder passes for at least the distance between viewer lens and frame lines.

Figure 1:
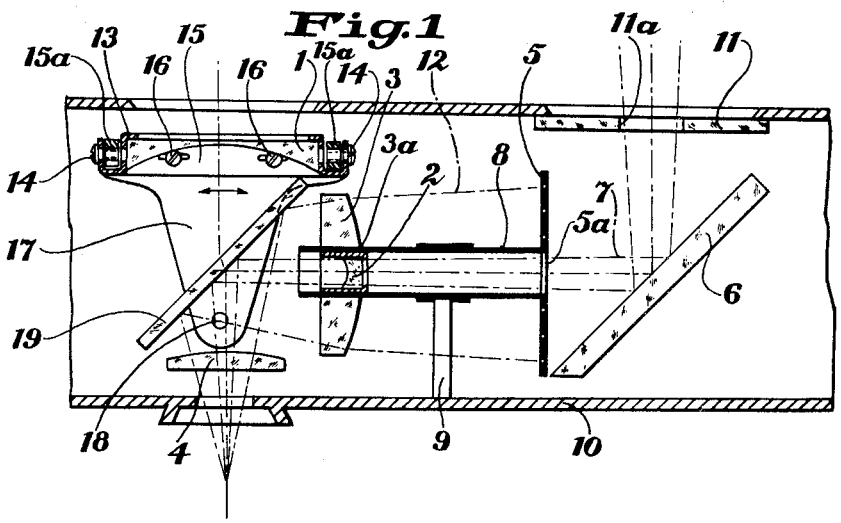
Figure 2:
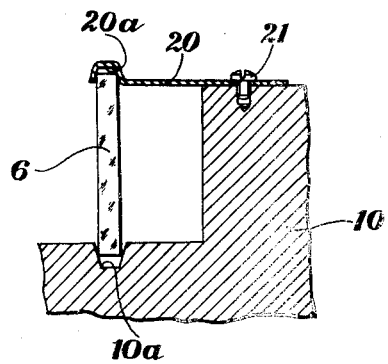

Further details of the invention, e.g. the possibility which is provided of adjusting different parts of the coupled range and viewfinder during assembly or even afterward, are disclosed in the following description of a preferred embodiment as well as in the claims and the accompanying drawings, in which:

Fig. 1 shows a schematic top view of one embodiment of a coupled range and viewfinder according to the invention, and Fig. 2 illustrates a preferred arrangement of a mirror in the housing.

The viewer lens 1 is located in the direct ray-path, and the viewer lens 2 of smaller diameter is in the deflected ray-path. A collimator lens 3 is provided through which the lines of the frame mark 5, located in the rangefinder base, can be clearly seen by means of the viewer eyepiece 4. The frame mark member 5 as well as the collimator lens 3 have in their central portions recesses 5a, 3a, which allow the deflected rangefinder beam 7, coming from the rangefinder mirror 6, to pass. Between the collimator lens 3 and the image mark 5 a light tight tube 8 is provided which is on the one end held in the recess 3a of the collimator lens e.g. by means of cementing and engages on the other end the recess 5a of the frame mark member 5. Optionally, the tube 8 may also be connected with the housing 10 of the coupled range and viewfinder via a special support 9. At the viewer end, the tube 8 receives the diverging viewer lens 2. For adjustment of the viewer lens 2, the tube 8 may be journaled in the recess 3a of the collimator lens 3 and the viewer lens 2 journaled in the tube 8, in such manner that at least one of them is shiftable in the axial direction.

The frame mark 5 is illuminated by light reflected from the base end mirror 6 of the rangefinder, which is made larger than customary for this purpose. In front of the mirror 6 a diffusing disk 11 is arranged, having in its central portion a recess 11a which allows the rangefinder beam 7 to pass. The disk 11 is optionally transparent, in which case it would be practical to provide the side facing the mirror 6 with a ground surface having a clear area corresponding to the recess 11a.

The holder 13 for the viewer lens 1 is slidably secured to an offset flange 15a of a support 15 by means of the screws 14. The support 15 is secured to a rocking lever 17 in such a manner as to be laterally adjustable by means of the screws 16 passing through slots in the base of the support 15. This arrangement facilitates that the viewer lens 1 may be adjusted in such a way that possible vertical or horizontal disalignments may be corrected. The rocking lever 17 is pivotable about its pivot 18 for the determination of the range by the variation in the deflection of the direct viewfinder beam as the viewer lens moves.

Fig. 2 shows a preferred arrangement for mounting the rangefinder mirror 6 and/or the semi-transparent beam combining mirror 19. The mirror 6 is shown journaled in the housing 10 of the coupled range and viewfinder. In the floor of said housing 10 grooves 10a are provided which receive one edge of the mirror 6 or 19 respectively. Blade springs 20, retaining the mirror 6 or 19 respectively, are slidably secured to the housing 10 by means of screws 21. For this purpose the blade springs 20 have offsets 20a, overlapping the mirror 6 or 19 respectively. By the movability of the springs 20 relative to the housing 10, the mirror 6 or 19 respectively may easily be adjusted to be vertical to the measuring plane.

I claim:

1. A combined rangefinder and Galilean type projected frame viewfinder for a photographic camera, comprising (1) a front diverging lens, (2) a rear converging lens spaced substantially afocally behind the diverging lens and optically coaxially aligned therewith for direct passage of the viewfinder beam which also serves as one of the two rangefinder beams, (3) two mirrors mounted parallel to each other in planes at approximately 45° to the axis of the viewfinder and spaced apart to define a rangefinder base, one mirror being partially transparent and positioned between the two viewfinder lenses to reflect the indirect rangefinder beam from the second mirror into said rear lens, (4) a second diverging lens arranged in said indirect beam within said base spaced substantially afocally from and optically coaxial with said rear lens, i.e. in a position such that a ray along its axis is reflected into coincidence with the axis of said rear lens, said second diverging lens having substantially the same focal length and a smaller diameter than said front diverging lens, (5) an opaque frame mark member mounted within said rangefinder base near said second mirror having a central transparent area adapted to pass said rangefinder beam and having transparent frame lines transilluminated by light reflected from said second mirror and adapted to define a rectangular field of view corresponding to that of a camera with which the rangefinder is adapted to be used, said second mirror being large enough to reflect a beam as large in cross section as the area bounded by said set of frame lines, (6) a second converging lens mounted within said rangefinder base between said partially transparent mirror and said frame mark member, provided with a central aperture larger in diameter than said second diverging lens and arranged coaxially therewith, in which the position and focal length of said second converging lens are so chosen that it cooperates with said rear converging lens and said partially transparent mirror to form a distant virtual image of said transparent frame lines which image appears superimposed upon the field to be photographed, (7) an opaque tubular shield extending from said frame mark member at least to said second converging lens and surrounding said indirect rangefinder beam to isolate it from the rays from said frame lines, (8) a light-diffusing plate mounted in front of said second mirror for providing diffused light for illuminating said frame lines, said plate having a clear transparent central area for transmitting the indirect rangefinder beam, (9) a holder for said front diverging lens, (10) a yoke having a base and two vertical arms to which arms said holder is attached for vertical adjustment during assembly, (11) a rocking lever to which said base of said yoke is secured, said rocking lever being rotatable about a vertical axis substantially intersecting the viewfinder axis behind said partially transparent mirror for moving said front diverging lens laterally for progressively deviating said direct beam for range measuring, and (12) a housing for supporting all said parts in cooperative relationship and for excluding undesired light.

2. A combined rangefinder and viewfinder in accordance with claim 1 in which at least one of said mirrors is mounted with its lower edge in an accurately milled groove in the base of the rangefinder housing and with its upper edge held by a blade spring adjustably secured to the housing by screws for adjusting the mirror into a plane vertical to the measuring plane, said spring having offsets overlapping and holding the mirror.

References Cited in the file of this patent

UNITED STATES PATENTS

| | | |
|---|---|---|
| 2,486,453 | Whitson | Nov. 1, 1949 |
| 2,805,608 | Leitz et al. | Sept. 10, 1957 |

FOREIGN PATENTS

| | | |
|---|---|---|
| 523,662 | Great Britain | July 19, 1940 |
| 907,304 | France | June 18, 1945 |
| 862,403 | Germany | Jan. 12, 1953 |
| 915,649 | Germany | July 26, 1954 |